United States Patent
Ku

(10) Patent No.: US 7,363,068 B2
(45) Date of Patent: Apr. 22, 2008

(54) PORTABLE ELECTRONIC APPARATUS

(75) Inventor: Ming-Sheng Ku, Taipei County (TW)

(73) Assignee: BenQ Corporation (TW)

( * ) Notice: Subject to any disclaimer, the term of this patent is extended or adjusted under 35 U.S.C. 154(b) by 328 days.

(21) Appl. No.: 11/147,313

(22) Filed: Jun. 8, 2005

(65) Prior Publication Data
US 2005/0277451 A1 Dec. 15, 2005

(30) Foreign Application Priority Data
Jun. 9, 2004 (TW) ............................. 93116525 A

(51) Int. Cl.
*H04M 1/00* (2006.01)
(52) U.S. Cl. .................. 455/575.4; 455/575.3; 455/575.1; 455/575.8; 455/90.3; 455/347; 455/348; 379/433.11; 379/433.12; 379/433.13; 379/437
(58) Field of Classification Search ............ 455/575.1, 455/3, 4, 8, 90.3, 347–349; 379/433.01, 379/433.11–13, 437, 440
See application file for complete search history.

(56) References Cited

U.S. PATENT DOCUMENTS

| | | | |
|---|---|---|---|
| 6,226,189 B1 * | 5/2001 | Haffenden et al. | 361/814 |
| 6,397,078 B1 * | 5/2002 | Kim | 455/556.2 |
| 6,415,138 B2 * | 7/2002 | Sirola et al. | 455/90.1 |
| 6,859,978 B2 * | 3/2005 | Pan | 16/292 |
| 7,079,875 B2 * | 7/2006 | Robertson, Jr. | 455/575.1 |
| 7,107,084 B2 * | 9/2006 | Duarte et al. | 455/575.3 |
| 2005/0130720 A1 * | 6/2005 | Finke-Anlauff | 455/575.3 |

* cited by examiner

*Primary Examiner*—Tuan A Tran
(74) *Attorney, Agent, or Firm*—Rader Fishman & Grauer PLLC

(57) ABSTRACT

A portable electronic apparatus including an apparatus body having an angle-adjustment device and a sliding-cover is provided. The sliding-cover selectively covers an internal space of the apparatus body and forms a rotatable connection with the angle-adjustment device. By the angle-adjustment device, the sliding-cover rotated relative to the apparatus body at any angle greater the 0 degree is used as a base for holding the apparatus body in a stable state.

17 Claims, 7 Drawing Sheets

PORTABLE ELECTRONIC APPARATUS

CROSS REFERENCE TO RELATED APPLICATIONS

This Application claims the right of priority based on Taiwan Patent Application No. 93116525 entitled "Portable Electronic Apparatus" filed on Jun. 9, 2004, which is incorporated herein by reference.

FIELD OF INVENTION

The present invention relates to a portable electronic apparatus with an angle-adjustment device and a sliding-cover capable of being converted into a supporting frame for the portable electronic apparatus.

BACKGROUND OF THE INVENTION

Nowadays, it has been very popular to live with portable electronic apparatuses, such as cell phones, electrical translators, PDAs, digital cameras, portable music players, pen-shaped recorders, or even the advanced video conference cell phones, as well as any other apparatuses combining thereof. Such portable apparatuses are typically fabricated as light and thin as being easy to carry, therefore, while being put on a surface plane, they are usually in the situation of lying down rather than standing up due to being hardly kept steady.

However, to erect the portable electronic apparatuses straight up over a plane is sometimes necessary in order to perform certain functions completely. For instances, time-displaying cell phone is commonly used as a clock by erecting it on a desk with a holder. Likewise, the advanced videoconference cell phone also needs to be raised up over a plane, so that the user can easily watch the video as well as talking through the phone without the necessity of holding it. Besides, to make a lighter and thinner digital camera straight up over a plane is occasionally required, for example, when the user attempts to snapshot himself or herself, and by which the shakes caused from holding it with hands are avoided as well.

Currently, in order to fulfill the above requirements, the portable apparatuses are often provided together with some separately holders as accessories. Or the users may alternatively find other various multi-functional holders through the market, like such popular holders for cell phones. Even through, there still lacks a light and handy portable electronic apparatus integrated with a holder for satisfying the user's requirements in operation and transportation.

SUMMARY OF THE INVENTION

The present invention provides a portable electronic apparatus, including an apparatus body having an angle-adjustment device and a sliding-cover. The sliding-cover selectively covers an internal space of the apparatus body and forms a rotatable connection with the angle-adjustment device. By the angle-adjustment device, the sliding-cover rotated relative to the apparatus body at any angle greater than 0 degree is used as a base for holding the apparatus body in a stable state.

DETAILED DESCRIPTION OF THE INVENTION

Figure 1:
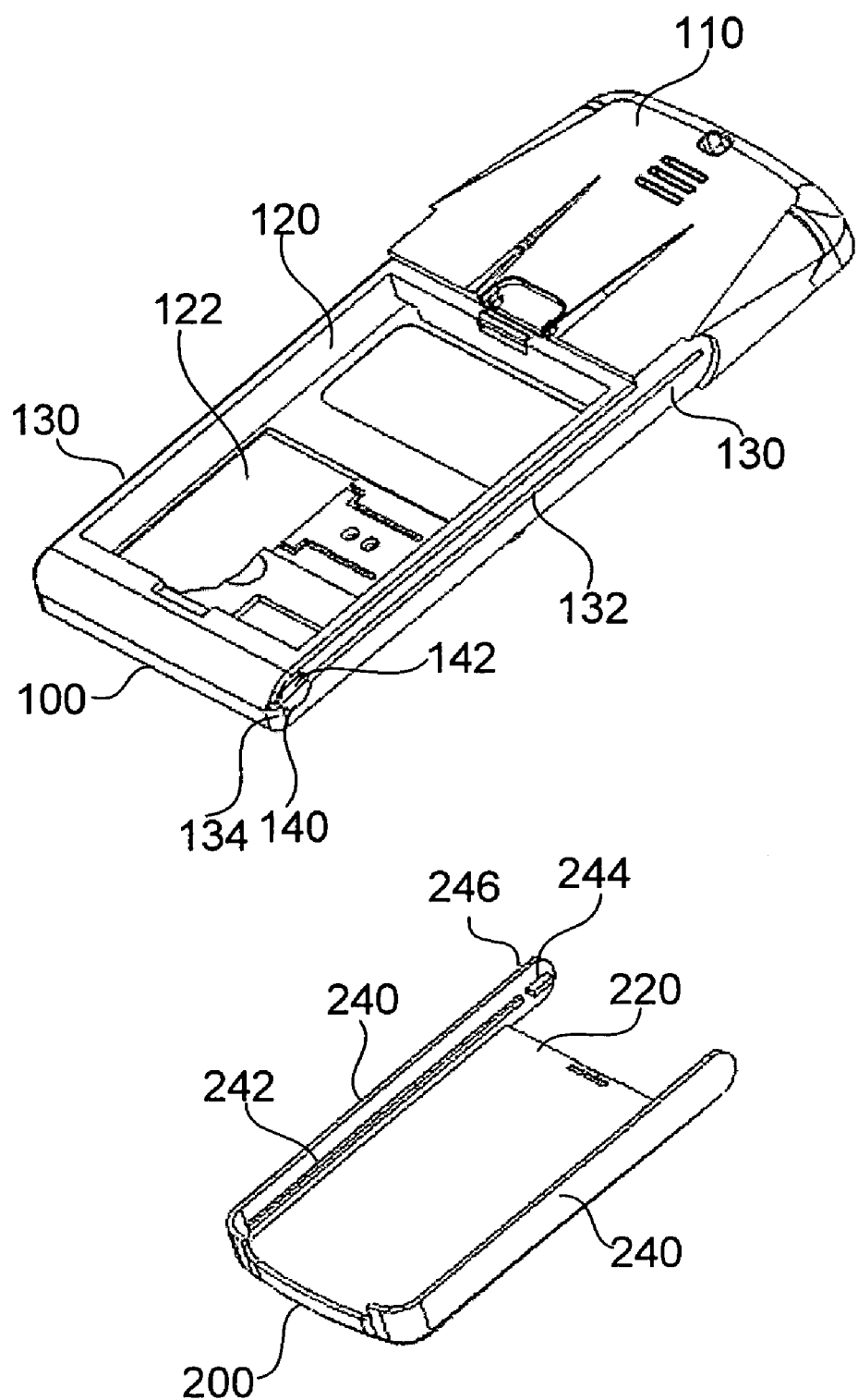
FIG. 1 shows the apparatus body and the sliding-cover before assembling in accordance with the present invention.

The portable electronic apparatus is described and illustrated by way of a cell phone that is one of the preferred embodiments in accordance with the present invention. As shown in FIG. 1, the cell phone includes an apparatus body 100 and a sliding-cover 200. The apparatus body 100 includes a external surface 110, an internal space 120 used to accommodate batteries or any other necessary devices, two lateral sides 130 with first grooves 132, and two angle-adjustment device 140 inserted into the end of the apparatus body 100. Each angle-adjustment device 140 includes a second groove 142 being able to interconnect with the corresponding first groove 132. The sliding-cover 200 includes a shield 220 and two lateral ribs 240 positioned beside the shield 220. It should be noted that the lateral rib 240 is longer the shield 220 by an extended portion 246. Further, there are a first rail 242 and a second rail 244 respectively fixed on the inner rim of each lateral rib 240, and more particularly, the second rail 244 is on the inner rim of the extended portion 246.

Figure 2A:
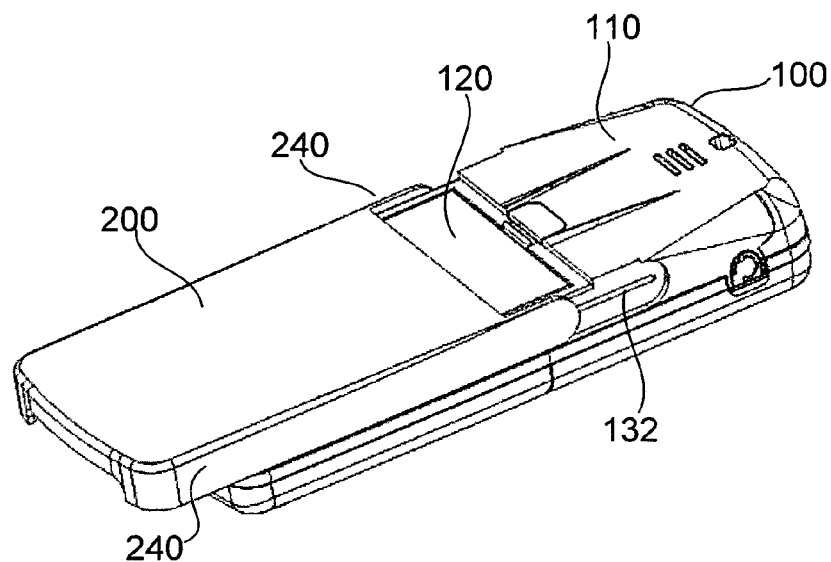
FIG. 2A shows the apparatus body and the sliding-cover after assembling in accordance with the present invention.

FIG. 2A shows how the sliding-cover 200 assembles with the apparatus body 100.

It should be understood from FIG. 1 and FIG. 2A, by way of the first rail 242 and the second rail 244 sliding in the first groove 132 and the second groove 142, the sliding-cover 200 can selectively cover the internal space 120, which includes a space 122 for batteries or other devices. In other words, the sliding-cover 200 may be designed as a battery lid for the cell phone, or likewise, being designed as a key protection lid that prevents the user from touching the keys unintentionally during the standby mode of the cell phone.

Figures 2B, 2C, 2D:
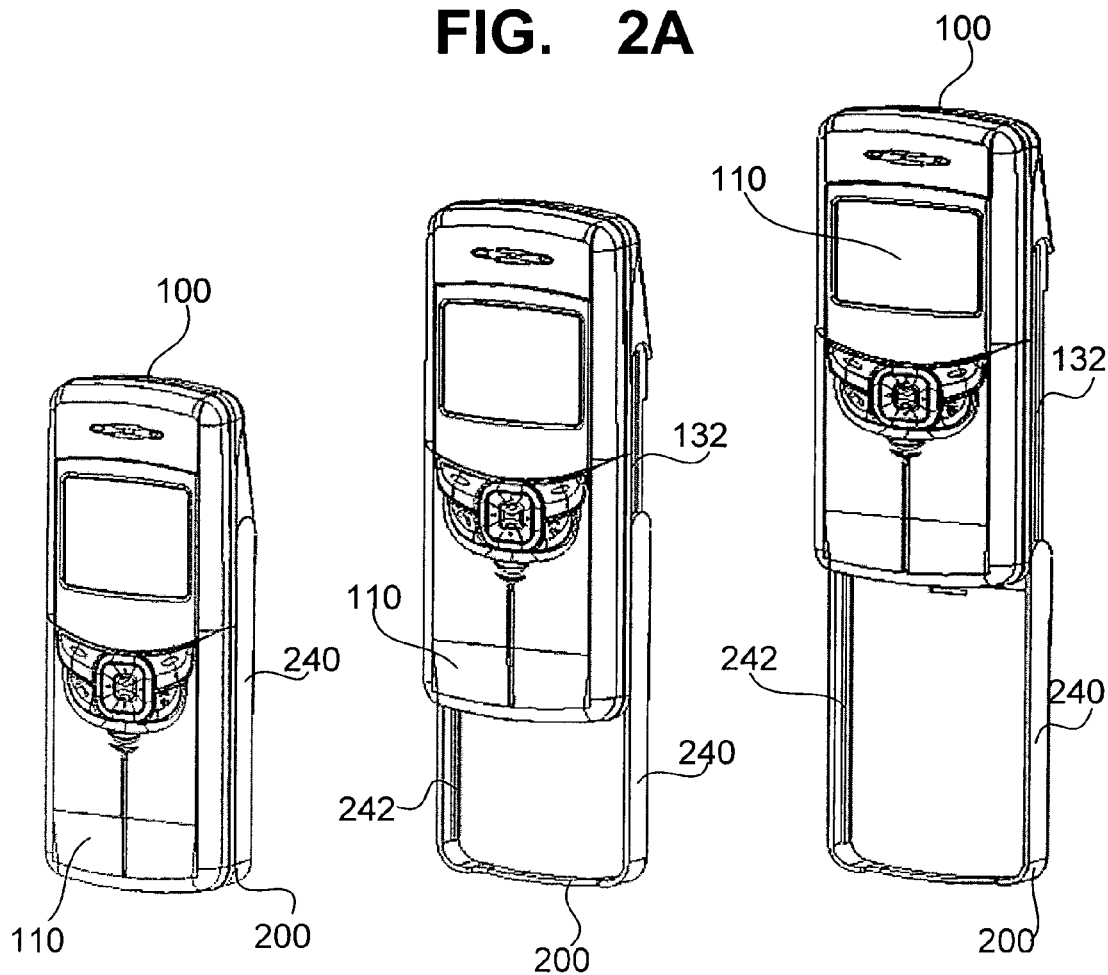
FIGS. 2B-2D show the sliding-cover selectively covering the internal space of the apparatus body in accordance with the present invention.

FIGS. 2B-2D show a first state that the sliding-cover 200 parallels with the apparatus body 100 by sliding thereon as the above described. FIG. 2B shows the sliding-cover 200 completely engaging with the apparatus body 100. FIGS. 2C and 2D respectively shows the sliding-cover 200 sliding till the middle and the end of the apparatus body 100.

Figure 3A:
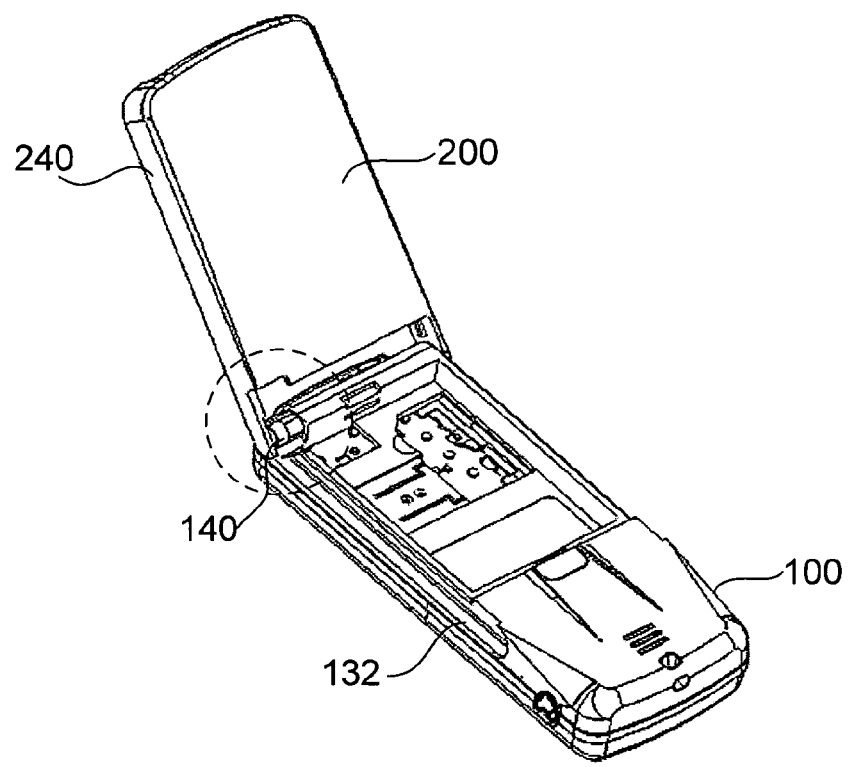
FIG. 3A shows the sliding-cover forming a rotatable connection with the angle-adjustment device of the apparatus body in accordance with the present invention.
Figure 3B:
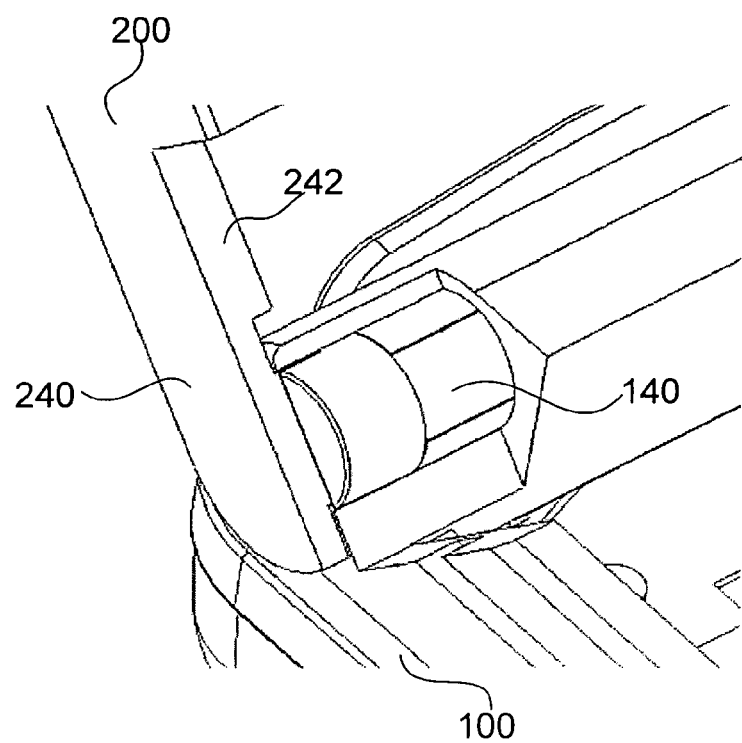
FIG. 3B is an amplified view showing the area marked with dotted line in FIG. 3A.

Now referring to FIG. 3A, while the sliding-cover 200 is sliding till the end of the apparatus body 100, it forms a rotatable connection with the angle-adjustment device 140 by the engagement of the second rail 244 and the second groove 142, that is shown in the area marked with dotted line. FIG. 3B further presents an amplified view showing the marked area of FIG. 3A. It should be noticed in FIGS. 3A-3B that a portion of the outer shell wrapping the angle-adjustment device is on-purpose removed in order to apparently illustrate the engagement described as above.

Figure 3C:
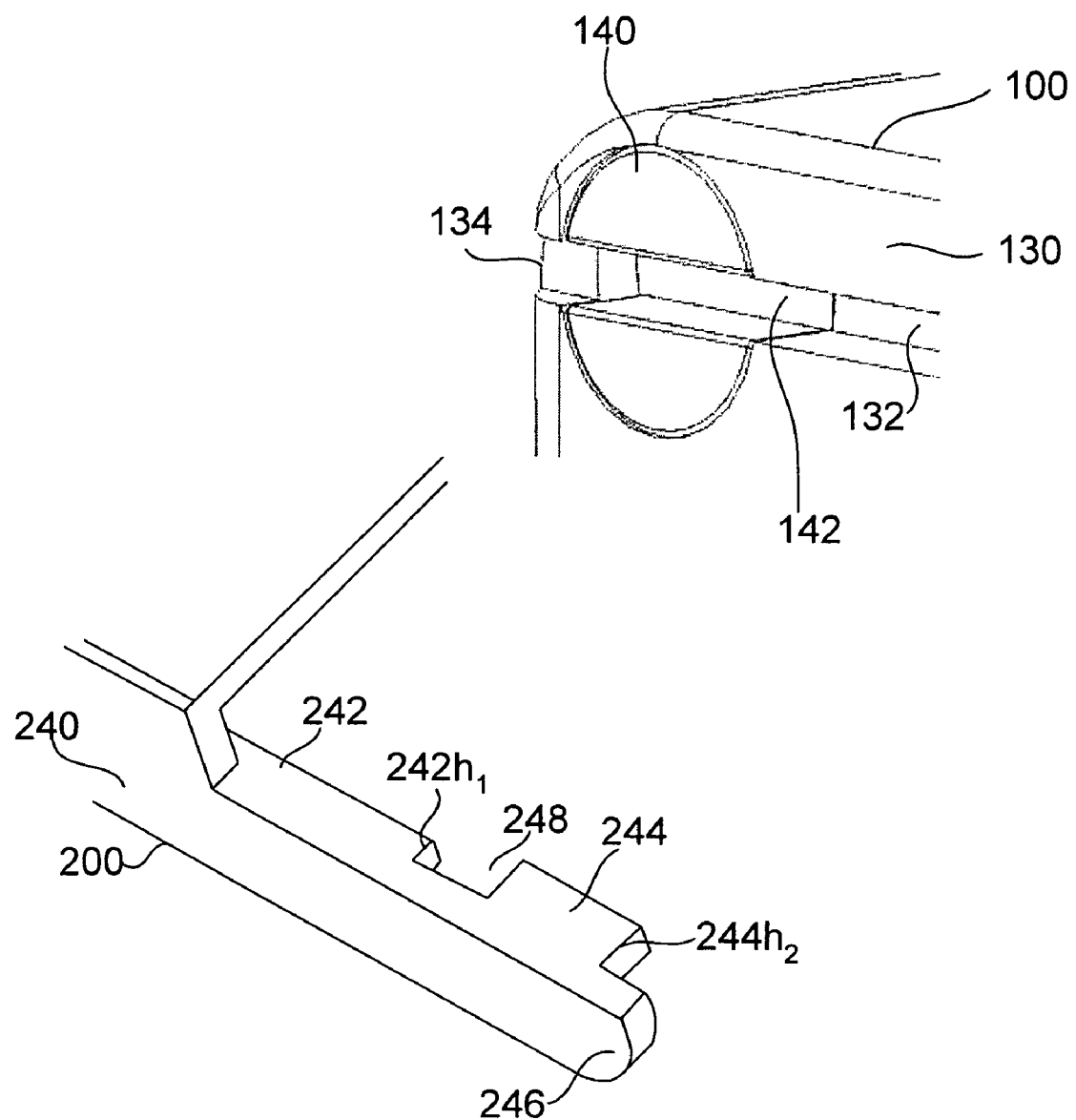
FIG. 3C is another amplified view showing a portion of the sliding-cover and a portion of the apparatus body in accordance with the present invention.

FIG. 3C presents another amplified view showing a portion of the sliding-cover 200 and a portion of the apparatus body 100. It should be understood from FIG. 3C that the length of the second rail 244 cannot be longer than the length of the second groove 142 with which the second rail 244 is engaged, otherwise the sliding-cover 200 would not be rotatable. Further, the first rail 242 and the second rail 244 are separated by a gap 248 that is designed to avoid being obstructed by the apparatus body 100 while the sliding-cover 200 is rotating. The size of the gap 248 is consequently related to the ambit that the sliding-cover 200 can reach by rotating. Besides, in order to prevent the sliding-cover 200 disengaging from the apparatus body 100 while sliding thereon, the height of the second rail 244 ($244h_2$) is designed to be greater than the height of the first rail 242 ($242h_1$), together with setting a protrusion 134 positioned at the end of the apparatus body 100, so that the higher second rail 244 of the sliding-cover 200 can be blocked by the protrusion 134.

Figure 4:
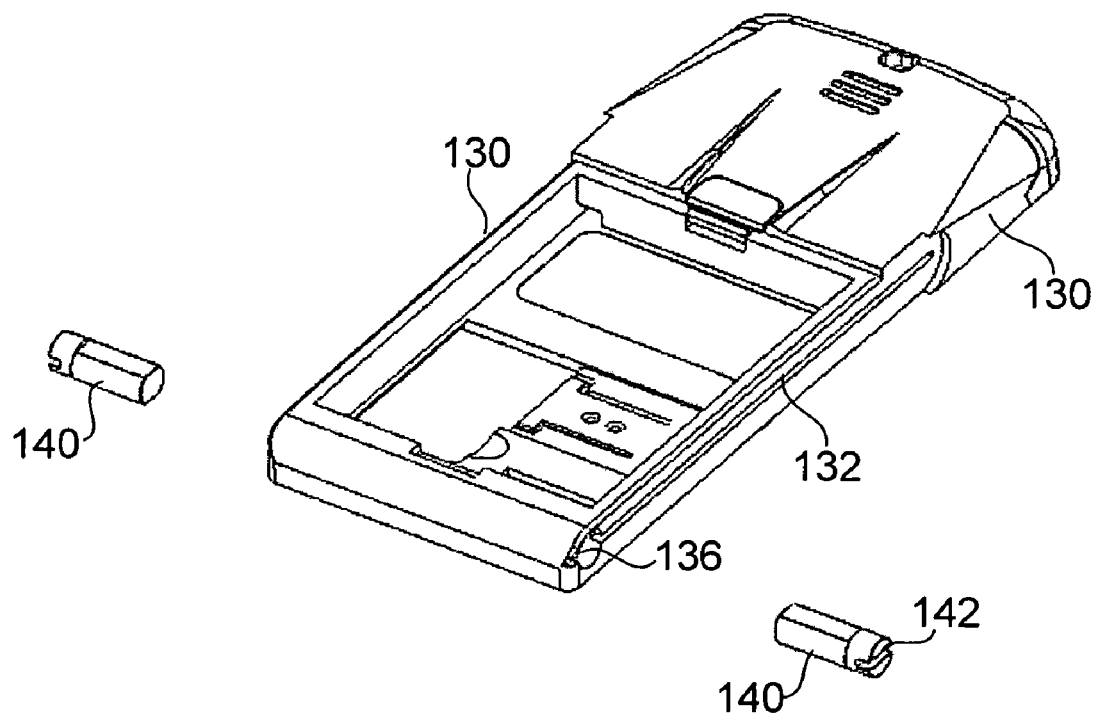
FIG. 4 shows the apparatus body and its angle-adjustment devices before assembling in accordance with the present invention.

FIG. 4 shows the cavities 136 located on the two lateral sides 130 of the apparatus body 100, which are used to be inserted with the angle-adjustment devices 140.

Figure 5:
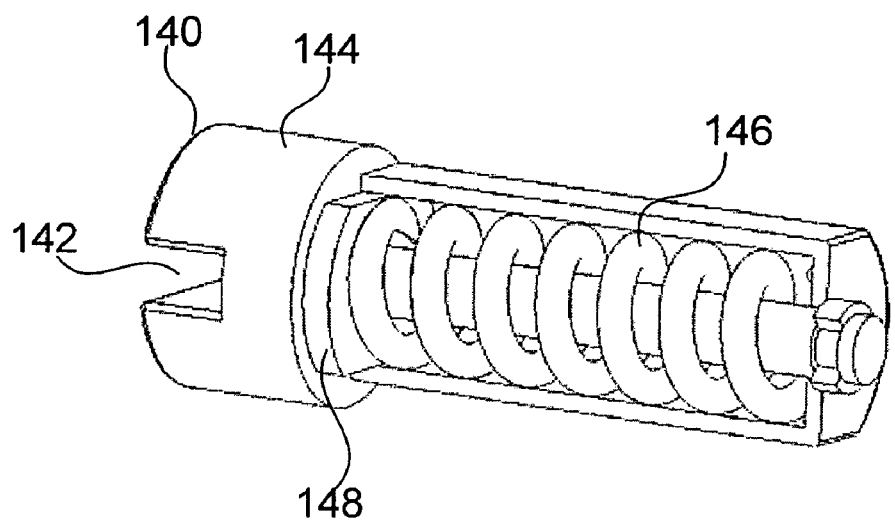
FIG. 5 is a sectional view showing the structure of the angle-adjustment device.

FIG. 5 shows the structure of the angle-adjustment device 140 known for persons skilled in the art, including a turning device 144 with the second groove 142, an elastic device 146 and a wear-resisting device 148. When the angle-adjustment device 140 is rotated by a turning force resulted from the elastic device 146, a counter force coming from the elastic device 146 pushes the wear-resisting device 148 to press upon the turning device 144 back, thus a friction between the turning device 144 and the wear-resisting device 148 is generated, that makes such rotation controllably stop at any angle.

Figure 6A:
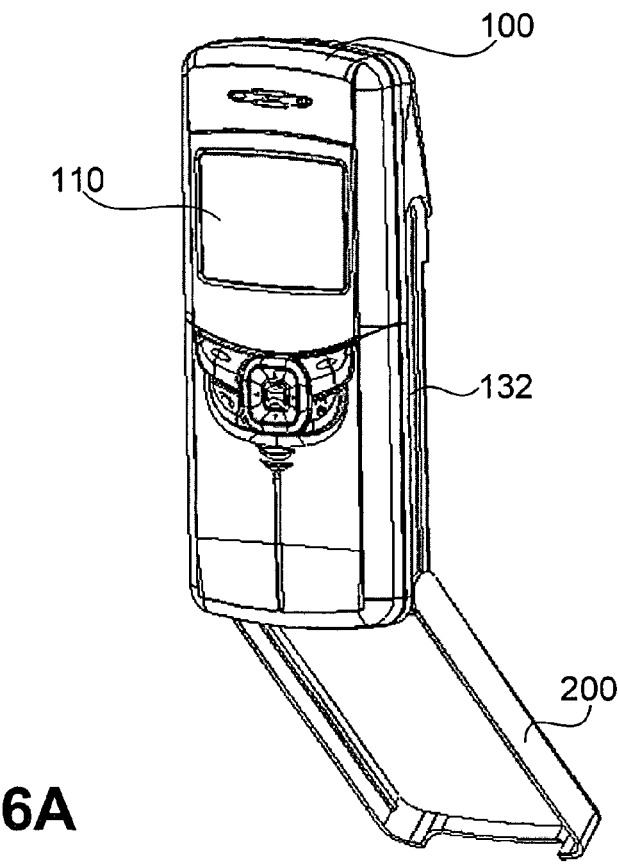
FIGS. 6A-6D show that the sliding-cover rotated relative to the apparatus body respectively at 45°, 90°, 115° and 135° is in a stable second state in accordance with the present invention.
Figure 6B:
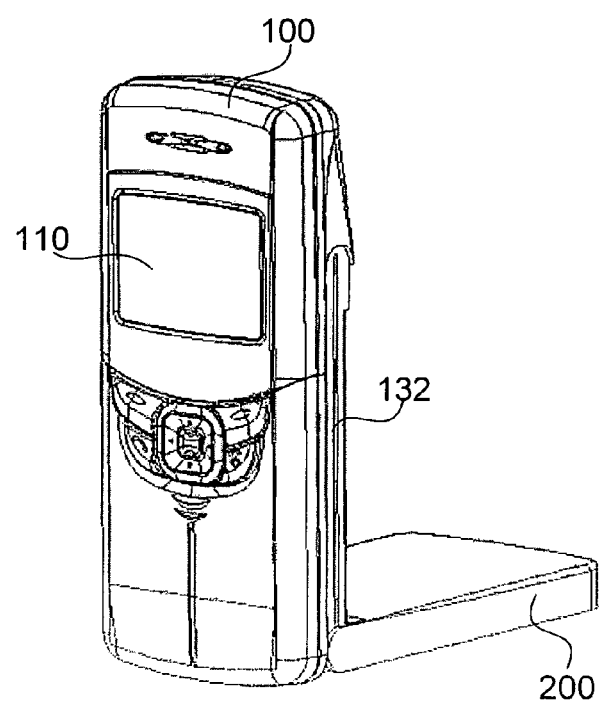
Figure 6C:
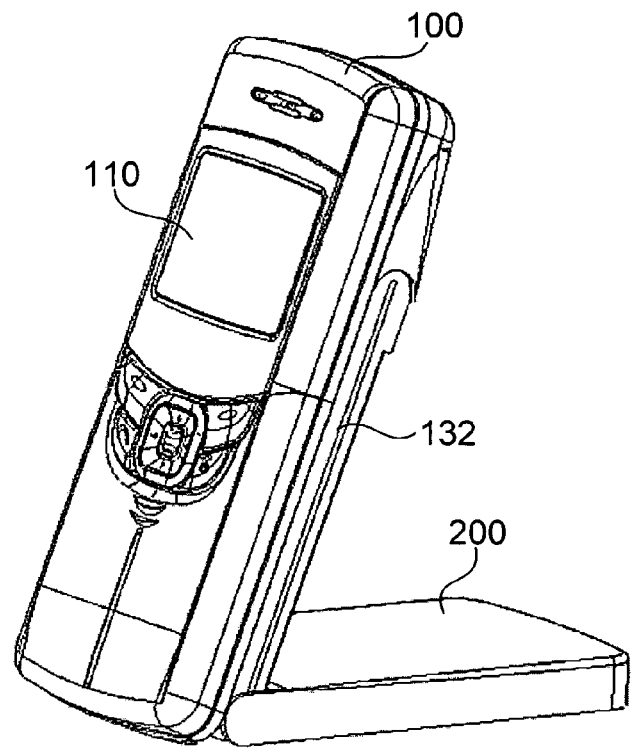
Figure 6D:
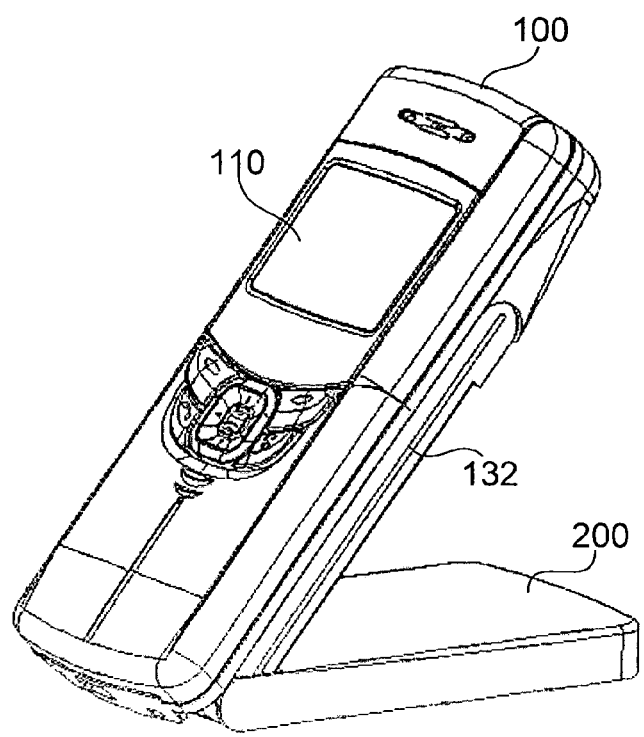

By way of the angel-adjustment device 140, a second state is consequently defined as the sliding-cover 200 rotating relative the apparatus body 100 at any angle greater than 0 degree. In other words, the apparatus body 100 is capable of supporting said sliding-cover 200 in a stable state during the second state. FIGS. 6A-6D show the sliding-covers 200 in the stable states after rotating respectively at 45°, 90°, 115° and 135° relative to the apparatus bodies 100. Particularly, as shown in FIGS. 6B, 6C, and 6D, by cooperating with the angle-adjustment device 140, the sliding-cover 200 can be configured to support the apparatus body 100 at different angles.

Accordingly, it should be understood that the present invention provides a portable electronic apparatus with a sliding-cover being able to be a holder, by which the portable electronic apparatus can be erected on a table at any angle depending on the preferences of the user without a separately holder, so that the requirements in operation and transportation described as above are satisfied as well.

The present invention has been described above with reference to preferred embodiments. However, those skilled in the art will understand that the scope of the present invention need not be limited to the disclosed preferred embodiments. On the contrary, it is intended to cover various modifications and equivalent arrangements within the scope defined in the following appended claims. The scope of the claims should be accorded the broadest interpretation so as to encompass all such modifications and equivalent arrangements.

The invention claimed is:

1. A portable electronic apparatus comprising:
   an apparatus body having an angle-adjustment device, said apparatus body being formed with an internal space and an external surface; and
   a sliding-cover slidably coupling with said apparatus body,
   wherein said sliding-cover is defined as in a first state when said sliding-cover slides to cover said internal space, and said sliding-cover is defined as in a second state when said sliding-cover slides to form a rotatable connection with said angle-adjustment device so as to be capable of rotating an angle greater than 0 degree relative to said apparatus body.

2. The portable electronic apparatus of claim 1, wherein said apparatus body has a first groove, and said sliding-cover has a first rail sliding in said first groove.

3. The portable electronic apparatus of claim 2, wherein said sliding-cover has a second rail, and said angle-adjustment device has a second groove engaged with said second rail such that said sliding-cover is rotatable relative to said apparatus body.

4. The portable electronic apparatus of claim 3, wherein said sliding-cover comprises a shield and a lateral rib longer than said shield, wherein a portion, of said lateral rib, extending beyond said shield forms an extended portion, and said extended portion further includes said second rail.

5. The portable electronic apparatus of claim 3, wherein said first rail and said second rail are separated by a gap.

6. The portable electronic apparatus of claim 3, wherein:
   the height of said first rail is greater than the height of said second rail; and
   a protrusion positioned at the end of said apparatus body, for blocking said second rail, prevents said sliding-cover disengaging from said apparatus body while sliding thereon.

7. The portable electronic apparatus of claim 1, wherein said apparatus body has a cavity inserted with said angle-adjustment device.

8. The portable electronic apparatus of claim 1, wherein said angle-adjustment device comprises a wear-resisting device and an elastic device.

9. The portable electronic apparatus of claim 1, wherein said internal space comprises a battery space covered by said sliding-cover.

10. The portable elctronic apparatus of claim 1, wherein said sliding-cover rotates to support said apparatus body in said second state.

11. A portable electronic apparatus comprising:
    an apparatus body including an external surface, a first groove and an angle-adjustment device formed with a second groove; and
    a sliding-cover, having a first rail sliding in said first groove, selectively covering an internal space within said apparatus body,
    wherein said sliding-cover is defined as in a first state when said sliding-cover is parallel with said apparatus body; and said sliding-cover, having a second rail engaged with said second groove, forms a rotatable connection with said angle-adjustment device.

12. The portable electronic apparatus of claim 11, wherein said sliding-cover is defined as in a second state when said sliding-cover rotates an angle greater than 0 degree relative to said apparatus body; and said apparatus body is capable of stably supporting said sliding-cover in said second state.

13. The portable electronic apparatus of claim 11, wherein said apparatus body has a cavity inserted with said angle-adjustment device.

14. The portable electronic apparatus of claim 11, wherein said angle-adjustment device comprises a wear-resisting device and an elastic device.

15. The portable electronic apparatus of claim 11, wherein said sliding-cover comprises a shield and a lateral rib longer than said shield, wherein a portion, of said lateral rib, extending beyond said shield forms an extended portion, and said extended portion further includes said second rail.

16. The portable electronic apparatus of claim 11, wherein said first rail and said second rail are separated by a gap.

17. The portable electronic apparatus of claim 11, wherein:
- the height of said first rail is greater than the height of said second rail; and
- a protrusion positioned at the end of said apparatus body, for blocking said second rail, prevents said sliding-cover disengaging from said apparatus body while sliding thereon.

* * * * *